United States Patent [19]

Steube

[11] 4,421,399

[45] Dec. 20, 1983

[54] PROCESSING ARRANGEMENT FOR PHOTOSENSITIVE ARTICLES INCLUDING A HEATER AND A FLUID CONTROL DEVICE

[75] Inventor: Fritz Steube, Buenos Aires Central, Argentina

[73] Assignee: AGFA-Gevaert Aktiengesellschaft, Leverkusen, Fed. Rep. of Germany

[21] Appl. No.: 452,640

[22] Filed: Dec. 23, 1982

[30] Foreign Application Priority Data

Dec. 30, 1981 [DE] Fed. Rep. of Germany ....... 3151949

[51] Int. Cl.³ .............................................. G03B 3/06

[52] U.S. Cl. .................................... 354/299; 354/324; 137/563

[58] Field of Search ............... 354/299, 324, 325, 319; 134/64 P, 122 P; 137/341, 563

[56] References Cited

U.S. PATENT DOCUMENTS

| | | | |
|---|---|---|---|
| 3,832,730 | 8/1974 | Geyken et al. | 354/299 |
| 3,978,506 | 8/1976 | Geyken et al. | 354/324 |
| 3,990,088 | 11/1976 | Takita | 354/324 |
| 4,104,668 | 8/1978 | Laar | 354/299 |
| 4,160,594 | 7/1979 | Geyken et al. | 354/324 |
| 4,349,267 | 9/1982 | Ohtani | 354/324 |

FOREIGN PATENT DOCUMENTS 1962422 3/1976 Fed. Rep. of Germany .

*Primary Examiner*—A. A. Mathews
*Attorney, Agent, or Firm*—Kontler, Grimes & Battersby

[57] ABSTRACT

An arrangement for developing film has a developing chamber which is provided with an inlet and an outlet for the developer. The chamber is located above a first container having an open upper end and arranged to receive developer discharged through the outlet of the chamber. This container is located inside of or above a second container arranged to receive developer which overflows from the first container. The containers have respective outlets which merge into a single conduit leading to the developing chamber. A heating device surrounds the conduit or is accommodated in the first container and functions to heat the developer to a predetermined temperature required for development. A pump for circulating the developer is arranged in the conduit which leads to the developing chamber. The outlet of the second container is provided with a valve which is controlled by a thermal sensor. The total quantity of the developer greatly exceeds that which is actually required and the bulk of the developer is initially accommodated by the second container. Only sufficient developer to fill the developing chamber and to maintain circulation from the latter through the first container and the conduit back to the developing chamber is not received by the second container. The pump and the heating device are activated while the thermal sensor maintains the valve in its closed position. Thus, only the small portion of the may be enhanced by overflow from the first container to the second container. developer which is not accommodated by the second container is circulated and subjected to the action of the heating device. Accordingly, this portion of the developer is heated to the developing temperature very rapidly thereby permitting the developing operation to begin shortly after the arrangement is activated. Once the developing temperature has been reached, the thermal sensor opens the valve to progressively mix the cool developer from the second container with the circulating hot developer. Such mixing may be enhance

24 Claims, 3 Drawing Figures

PROCESSING ARRANGEMENT FOR PHOTOSENSITIVE ARTICLES INCLUDING A HEATER AND A FLUID CONTROL DEVICE

BACKGROUND OF THE INVENTION

The invention relates generally to an arrangement for processing photosensitive articles.

More particularly, the invention relates to an arrangement for developing photosensitive articles such as film and the like.

A known arrangement for developing photosensitive articles has a processing chamber which is provided with a fluid inlet and a fluid outlet. The inlet communicates with a pump which delivers heated processing fluid to the chamber. The fluid is discharged from the chamber via the outlet and is received by a container having a capacity which greatly exceeds the capacity of the chamber. The fluid is withdrawn from the container by the pump and is recirculated to the processing chamber.

A developing arrangement of this type is disclosed, for example, in the German Pat. No. 19 62 422. This arrangement operates with a volume of processing fluid which substantially exceeds that required to fill the processing chamber and to maintain fluid circulation. A large quantity of processing fluid is used in order to maintain the chemical activity of the processing fluid relatively constant over an extended period of time.

As mentioned earlier, the processing fluid is heated. In order to place the arrangement in condition for operation, the entire quantity of fluid must be heated to the operating temperature. To this end, the container is provided with a thermostatically regulated heating device. The thermostat for the heating device also controls a transporting device for conveying the photosensitive articles into the processing chamber and prevents the transporting device from starting until the fluid has reached its operating temperature.

The rated output of the heating device relative to the quantity of the processing fluid is such that, as a rule, the time required for the fluid to reach its operating temperature is considerable. The design of the electrical circuitry prevents the use of a heating device having a greater rated output, e.g., to accelerate the initial heating of the fluid. Consequently, the operating personnel normally switch on the heating device at the beginning of the working day and do not switch it off again until the end of the working day regardless of whether or not there are idle periods during which no processing takes place. On the one hand, heating of the fluid throughout the entire working day requires large amounts of energy. On the other hand, the fluid undergoes a substantial amount of oxidation when it is maintained at its operating temperature for the entire working day.

OBJECTS AND SUMMARY OF THE INVENTION

It is an object of the invention to provide a processing arrangement for photosensitive articles which may be placed in operating condition more rapidly than heretofore even though a heating device of the same rated output as in the prior art is used to heat the processing fluid to its operating temperature.

Another object of the invention is to provide a processing arrangement for photosensitive articles which enables energy consumption to be reduced.

An additional object of the invention is to provide a processing arrangement for photosensitive articles which enables oxidation of the processing fluid to be reduced.

The preceding objects, as well as others which will become apparent as the description proceeds, are achieved by the invention.

One aspect of the invention resides in an arrangement for processing photosensitive articles, particularly for developing film and the like. The arrangement comprises processing means having inlet and outlet means for a processing fluid. Container means is provided for the processing fluid and is arranged to receive fluid discharged from the outlet means. The container means includes first and second containers which respectively accommodate part of the fluid. The first and second containers respectively have first and second outlets. Conduit means connects the first and second outlets with the inlet means of the processing chamber. The arrangement further comprises pump means for circulating the fluid and heating means for heating the fluid. Flow regulating means is provided for regulating the flow of fluid from the first container to the heating means. The regulating means has a first position in which the outlet of the first container is closed to prevent fluid flow from the first container to the heating means. The regulating means also has a second position in which the outlet of the first container is open to permit fluid flow from the first container to the heating means. Automatic control means controls the regulating means and is operative to maintain the latter in its first position until the fluid from the second container is heated to a predetermined temperature, e.g., its operating temperature. The control means is further operative to move the regulating means to its second position when the fluid from the second container reaches the predetermined temperature.

The processing means may include one or more processing chambers.

The regulating means may be in the form of a valve and may be located between the first container and the pump means.

The total volume of the fluid as well as the total volume of the container means may considerably exceed the volume of the fluid which must be present in the processing means during processing.

The arrangement may be designed in such a manner that, prior to heating of the fluid, the second container accommodates approximately the volume of fluid required in the processing means during processing. The remainder of the fluid, excluding that which may be necessary in addition to the fluid for the processing means to maintain circulation through the second container, may be accommodated in the first container.

The provision of two containers in accordance with the invention makes it possible to divide the fluid into two portions. One such portion may be temporarily stored in one of the containers. This portion may constitute the bulk of the fluid and may serve the purpose of keeping the overall volume of the fluid large so that the chemical activity of the fluid remains relatively constant over an extended period of time. The other portion of the fluid may be circulated through the processing means and the other container while being heated. The latter portion of the fluid consitutes the minor part of the fluid and may have a volume approximately equal to that required to properly fill the processing means and maintain circulation.

By means of the invention, only a relatively small portion of the fluid need be heated in order to place the arrangement in condition for operation. Accordingly, the time and energy required to place the arrangement of the invention in such condition are greatly reduced. The automatic control means in the arrangement according to the invention permits the stored, large portion of the fluid to be mixed with the circulating, small portion of the fluid once the latter portion has been heated to the operating temperature. By appropriate design of the automatic control means, the large portion of the fluid may be mixed with the small portion in increments. The amount of fluid from the large portion which becomes mixed with the small portion then depends on the length of time for which the heating means operates. After a certain period of operation, the entire quantity of fluid will be in use as usual and the chemical characteristics of the fluid will be relatively uniform throughout.

If a limited quantity of photosensitive material is to be processed within a relatively short time period, the processing arrangement may be shut off once such material has passed through without heating the entire quantity of processing fluid.

The novel features which are considered as characteristic of the invention are set forth in particular in the appended claims. The improved processing arrangement itself, however, both as to its construction and its mode of operation, together with additional features and advantages thereof, will be best understood upon perusal of the following detailed description of certain specific emobidiments with reference to the accompanying drawing.

DESCRIPTION OF THE PREFERRED EMBODIMENTS

Figure 1:
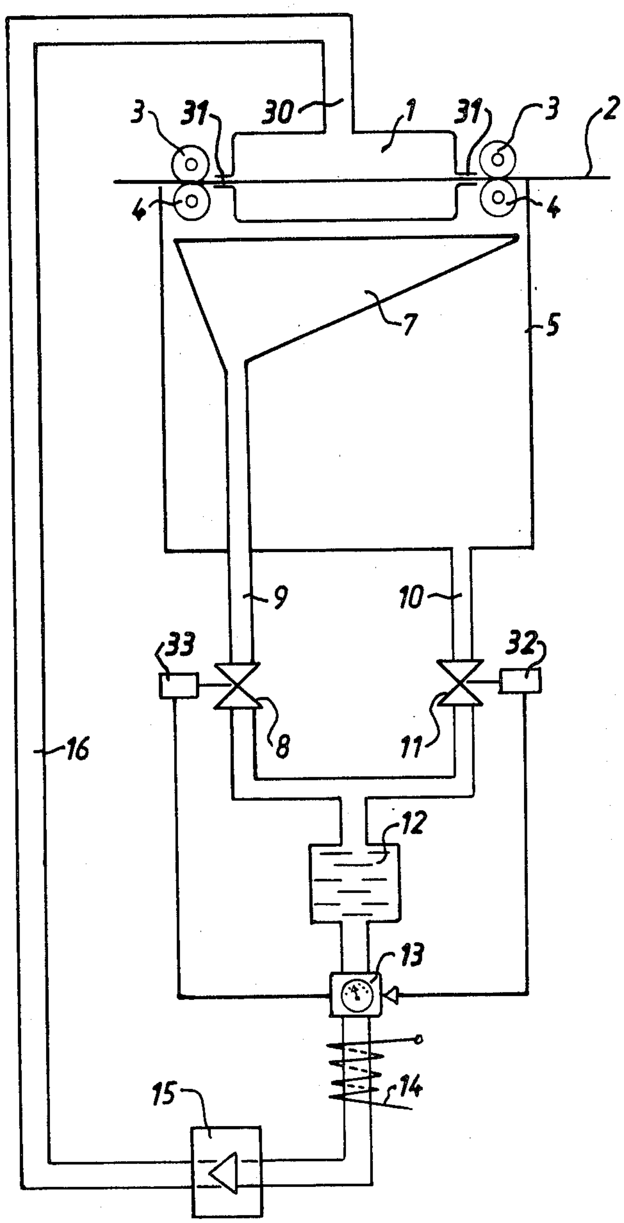
FIG. 1 schematically illustrates one embodiment of an arrangment in accordance with the invention for processing photosensitive articles.

The processing arrangement of FIG. 1 includes a processing chamber 1 which is here assumed to be a developing chamber for film and the like. The processing chamber 1 may, for example, be designed in accordance with the teachings of German Pat. No. 19 62 422. The processing chamber 1 has a fluid inlet 30 at its upper end. The processing chamber 1 further has a pair of opposed lateral apertures 31. A photosensitive article 2 such as film or the like which is to be developed in the processing chamber 1 enters the latter via one of the apertures 31 and leaves the processing chamber 1 through the other apertures 31. A pair of conveying rollers 3, 4 driven in any conventional manner is located in the region of each of the apertures 31. The two pairs of rollers 3, 4 smoothly convey the article 2 through the processing chamber 1.

The processing fluid or developer is circulated through and agitated in the processing chamber 1. Agitation of the processing fluid helps to ensure uniform processing of the article 2. Excess processing fluid is discharged from the processing chamber 1 via the apertures 31 which thus constitute fluid outlets in addition to serving as an entry and an exit for the article 2.

A container 5 is located below the processing chamber 1 and has a fluid outlet 10 which extends from its lower end. A solenoid valve or regulating device 11 is arranged in the fluid outlet 10 and may be closed to prevent fluid from flowing out of the container 5 as well as opened to permit the withdrawal of fluid from the container 5. The container 5 has an open upper end so that fluid discharged from the processing chamber 1 via the apertures 31 can enter the container 5.

A funnel-shaped container 7 is located internally of the container 5 in the region of the upper end thereof. The container 7 also has an open upper end and is arranged so that the processing fluid discharged from the apertures 31 of the processing chamber 1 flows into the same. The container 7 extends almost although not quite to the side walls of the container 5. A narrow gap thus remains between the container 7 and the side walls of the container 5 and permits fluid which overflows from the container 7 to flow downwardly in the container 5. The capacity of the container 7 is such that it can hold a volume of fluid approximating that which must be present in the processing chamber 1 for proper processing of the article 2. The volume of the container 7 is only a fraction, e.g., of the order of twenty percent, of the volume of the container 5. The total volume of the containers 5 and 7, as well as the total volume of the processing fluid, greatly exceeds the volume of fluid required by the processing chamber 1.

An outlet 9 extends downwardly from the lower end of the container 7. A solenoid value or regulating device 8 is arranged in the outlet 9 to regulate the flow of fluid out of the container 7.

The outlets 9 and 10 of the containers 7 and 5 merge into a conduit 16 which, in turn, communicates with the inlet 30 of the processing chamber 1. A mixing chamber 12 is interposed in the conduit 16 just downstream of the junction of the outlets 9 and 10. A thermometer of thermal sensor 13 is situated downstream of the mixing chamber 12 and is followed by a heating coil or heating means 14 which surrounds the conduit 16. The heating coil 14 is connected with a conventional control mechanism which prevents the temperature of the fluid from rising above the desired operating temperature, that is, the desired processing temperature for the article 2. A pump 15 is located downstream of the heating coil 14 and conveys the fluid which has been heated by the heating coil 14 to the processing chamber 1.

The thermometer 13, which senses the temperature of the fluid flowing in the conduit 16, is connected with a control mechanism 32. The control mechanism 32, in turn, is connected with the valve 11. The thermometer 13 and the control mechanism 32 together constitute a control unit or control means for the valve 11. As will be explained more fully below, the control unit 13, 32 maintains the valve 11 in its closed position during the initial heating phase in which only fluid from the container 7 is heated. When the temperature of the fluid immediately upstream of the heating coil 14 becomes such that the temperature of the fluid would be expected to rise above the desired processing temperature during passage of the fluid through the heating coil 14, the control unit 13, 32 causes the valve 11 to open.

The thermometer 13 may also be connected with a control mechanism 33 for the valve 8. The thermometer 13 and the control mechanism 33 then constitute a control unit or control means for the valve 8. Once the valve 11 has been opened, the control units 13, 33 and 13, 32 may control the valves 8 and 11 in such a manner that, as the temperature of the fluid immediately upstream of the heating coil 14 increases, the valve 8 is progressively closed while the valve 11 is progressively opened.

The processing arrangement of FIG. 1 operates as follows:

Initially, the container 5 accommodates all of the processing fluid excluding that required for the processing chamber 1 and to maintain circulation from the latter through the container 7 and the conduit 16 back to the processing chamber 1. Thus, the bulk of the fluid is located in the container 5. The part of the fluid which is not accommodated in the container 5 fills the container 7 which, as indicated previously, has a volume approximately equal to the volume of fluid required for the processing chamber 1. The entire volume of fluid is at a temperature lower than the proper processing temperature for the article 2, e.g., the fluid has a temperature of 20° C. while the desired processing temperature lies above 35° C.

In order to place the arrangment in condition for processing of the article 2, the pump 15 is started and the heating coil 14 is switched on. Since the temperature sensed by the thermometer 13 is low, the valve 11 is maintained in its closed position by the control unit 13, 32. On the other hand, the valve 8 is open. The pump 15 thus circulates only that portion of the fluid which is not accommodated in the container 5. This portion of the fluid is withdrawn from the container 7, pumped through the conduit 16 into the processing chamber 1 and then returned to the container 7. The fluid level in the container 7 drops somewhat when the pump 15 begins operating due to the fact that the fluid level in the processing chamber is raised. The drop in level of the container 7 prevents the overflow of fluid from the container 7 into the container 5.

During the period immediately following activation of the pump 15 and the heating coil 14, the heat generated by the latter is applied exclusively to heating of that portion of the fluid which is not confined by the container 5. Since the volume of this portion of the fluid is relatively small, such portion reaches the desired processing temperature very rapidly. Once the processing temperature has been reached, processing of the article 2 can begin and the rollers 3, 4 are started to convey the article 2 through the processing chamber 1.

When the processing fluid which is not accommodated by the container 5 reaches the processing temperature, the control unit 13, 32 causes the valve 11 to open thereby permitting fluid to flow out of the container 5. On the other hand, the control unit 13, 33 throttles the valve 8. As processing continues, the control units 13, 33 and 13, 32 regulate the respective valves 8 and 11 so that the temperature of the fluid leaving the mixing chamber 12 is such that the fluid is heated to the processing temperature during passage through the heating coil 14. The heating coil 14 continues to be operated at its rated capacity while the fluid from the container 5 is heated to the processing temperature although this would not be necessary to simply maintain the fluid which was not accommodated by the container 5 at the processing temperature.

The container 7 begins to overflow when fluid is withdrawn from the container 5. The heated fluid overflowing from the container 7 mixes with the fluid in the container 5 thereby causing some heating of the fluid in the container 5. The continued withdrawal of fluid from the container 5 eventually results in heating of the entire quantity of processing fluid to the processing temperature. Moreover, the fluid initially accommodated by the container 5 is incorporated in the circulating flow of fluid through the processing chamber 1 as withdrawal of fluid from the container 5 progresses. Once the entire quantity of processing fluid has reached the processing temperature, the output of the heating coil 14 is thermostatically reduced or the heating coil 14 is periodically switched off by means of a thermostat.

Figure 2:
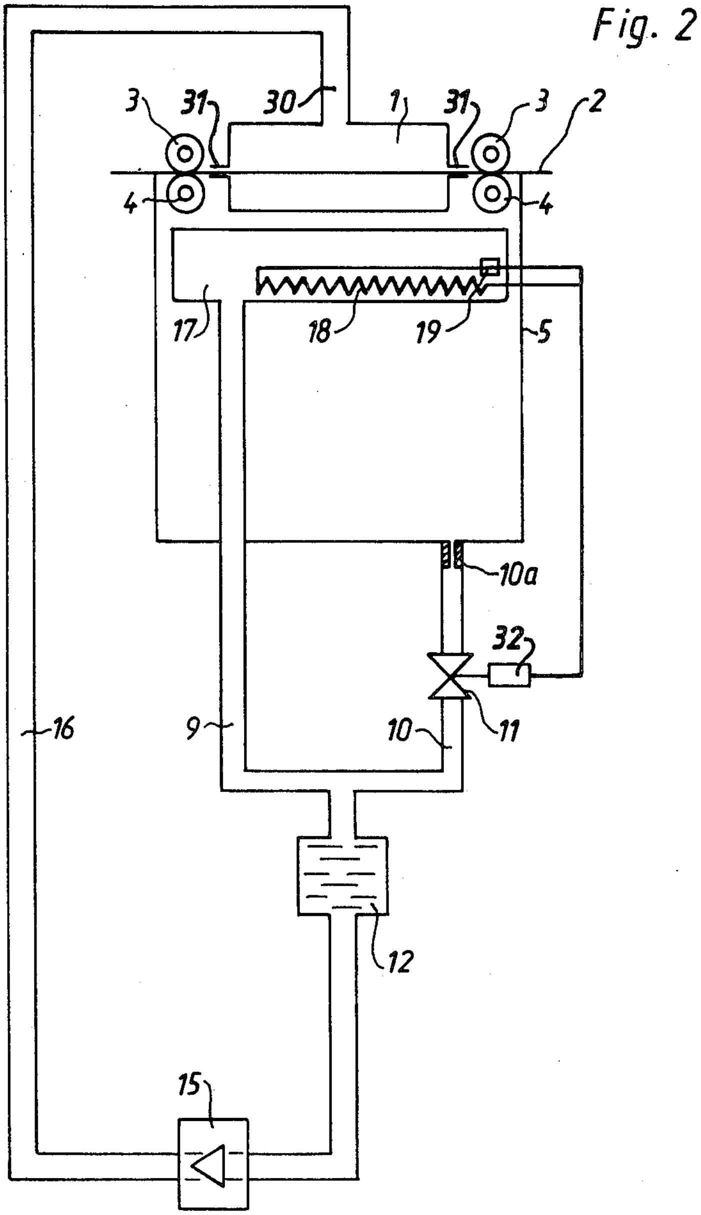
FIG. 2 schematically illustrates another embodiment of the processing arrangement.

In FIG. 2, the same reference numerals as in FIG. 1 have been used to designate like components. The container 7 of FIG. 1 is replaced by a container 17 having a different configuration but which, like the container 7, is located internally of the container 5 in the region of the upper end thereof. The container 17 has an open upper end and defines an overflow gap with the sidewalls of the container 5 as is the case for the container 7. The outlet 9 of the container 17 and the outlet 10 of the container 5 again merge into the common conduit 16. However, the outlet 10 in the processing arrangement of FIG. 2 is provided with a flow restricting member 10*a* which reduces the flow cross section of the outlet 10 to a value considerably below that for the outlet 9. For example, the flow restricting member 10*a* may reduce the flow cross section of the outlet 10 to approximately one-tenth of the flow cross section of the outlet 9.

In the processing arrangement of FIG. 2, the fluid is not heated immediately upstream of the pump 15. Thus, the heating coil 14 which surrounds the conduit 16 immediately upstream of the pump 15 is replaced by a heating element 18 located inside the container 17. The heating element 18 is regulated by a thermostat 19 which is also connected with the control mechanism 32 for the valve 11. The thermostat 19 and the control mechanism 32 together constitute a control unit or control means for the valve 11. The control unit 19, 32 opens the valve 11 when the heating element 18 is shut off by the thermostat 19. The control unit 19, 32 also functions to maintain the valve 11 in its closed position while the heating element 18 is operating.

The container 17 is arranged to directly receive the processing fluid discharged through the apertures 31 of the processing chamber 1. The volume of the container 17 approximates the volume of fluid required for the processing chamber 1. The total volume of the containers 5 and 17, as well as the total volume of the processing fluid, substantially exceeds the volume of processing fluid required for the processing chamber 1.

The processing arrangement of FIG. 2 operates as follows:

Prior to the start of operation, the container 5 accommodates all of the fluid except that which is required for the processing chamber 1 and to maintain circulation from the latter through the container 17 and the conduit 16 back to the processing chamber 1. The fluid accommodated by the container 5 constitutes the bulk of the processing fluid. The entire quantity of processing fluid is at the same temperature. This temperature is below the processing temperature.

Placing of the processing arrangement in condition for processing is begun by switching on the pump 15 and the heating element 18. The container 17 is initially full and the fluid level in the container 17 drops when the pump 15 is started due to the fact that a certain amount of fluid is required to bring the volume of fluid in the processing chamber 1 to the operating value. The drop in fluid level prevents the overflow of fluid from the container 17 into the container 5.

Since the control unit 19, 32 maintains the valve 11 in its closed position while the heating element 18 is operating, the heat generated by the heating element 18 is almost exclusively directed towards heating of that portion of the fluid which is not accommodated by the container 5. This portion of the fluid represents only a fraction of the entire quantity of processing fluid so that the heating time is relatively short, that is, the heating time for heating such portion of the fluid to the processing temperature is much shorter than the time required to heat the entire quantity of processing fluid to the processing temperature. When the portion of the fluid which is not accommodated by the container 5 reaches the processing temperature, the thermostat 19 shuts off the heating element 18 for the first time. This causes the valve 11 to be opened via the control unit 19, 32 so that fluid flows out of the container 5 and mixes with that leaving the container 17. Due to the presence of the flow restricting member 10*a* in the outlet 10, the amount of fluid flowing out of the container 17 greatly exceeds that flowing out of the container 5. If the flow restricting member 10*a* reduces the flow cross section of the outlet 10 to approximately one-tenth of the flow cross section of the outlet 9, the amount of fluid flowing out of the container 17 lies in a ratio of approximately 10:1 with the amount of fluid flowing out of the container 5.

When the fluid leaving the container 5 mixes with that leaving the container 17, a temperature drop occurs. This temperature drop is small since the amount of fluid leaving the container 17 greatly exceeds that leaving the container 5. Nevertheless, the temperature drop is sufficient to cause the thermostat 19 to activate the heating element 18 and close the valve 11. During the period immediately following the time at which the portion of the fluid which is not accommodated by the container 5 reaches the processing temperature, the valve 11 remains open only for very short intervals. The short intervals for which the valve 11 remains open combined with the small termperature drop during each such interval results in only small temperature fluctuations within the processing chamber 1. These temperature fluctuations are entirely within the permissible range for processing of the article 2.

As the fluid leaving the container 5 becomes warmer, the influence of such fluid decreases until the entire quantity of processing fluid reaches the processing temperature.

As in the case for the processing arrangement of FIG. 1, the entire quantity of processing fluid in the processing arrangement of FIG. 2 is available for processing in order to maintain the chemical activity relatively constant over an extended period of time.

Figure 3:
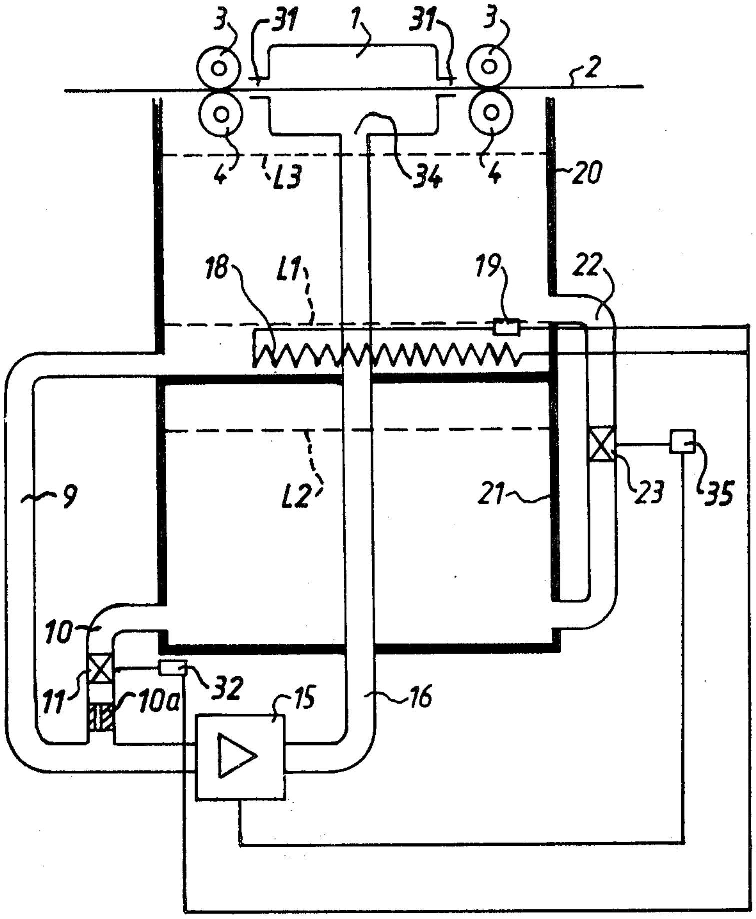
FIG. 3 schematically illustrates an additional embodiment of the processing arrangement.

In FIG. 3, the same reference numerals as in FIG. 2 have been used to identify like components. The processing chamber 1 of FIG. 3 differs from that of FIG. 2 in that an inlet opening 34 in the bottom of the processing chamber 1 replaces the inlet 30 which communicates with the top of the processing chamber 1.

The processing arrangement of FIG. 3 includes a container 20 which is located immediately below the processing chamber 1. The container 20 has an open upper end and is arranged to directly receive fluid discharged from the apertures 31 of the processing chamber 1. The volume of the container 20 is such that the container 20 can accommodate at least the predominant part of the processing fluid which, again, is present in an amount greatly exceeding that required for the processing chamber 1. The heating element 18 is situated at the bottom of the container 20.

A second container 21 is located beneath the container 20. An overflow pipe 22 leads from the container 20 to the container 21. The overflow pipe 22 opens into the container 20 at a level above the heating element 18 and the thermostat 19 so that both the heating element 18 and the thermostat 19 are always covered by fluid. As in the case for the container 20, the container 21 is sufficiently large to accommodate at least the predominant part of the processing fluid.

A solenoid valve or flow regulating device 23 is arranged in the overflow pipe 22. The valve 23 is connected with a control mechanism 35 which is in circuit with the pump 15. The control mechanism 35 maintains the valve 23 in a closed position while the pump 15 is operating. When the pump 15 stops, the control mechanism 35 causes the valve 23 to open thereby permitting fluid to flow from the container 20 into the container 21.

As before, the outlets 9 and 10 of the containers 20 and 21 merge into the common conduit 16. The outlet 10 is again provided with the flow restricting member 10*a* which, in contrast to the processing arrangement of FIG. 2, is located downstream of the valve 11.

Similarly to the processing arrangement of FIG. 2, the thermostat 19 and the regulating mechanism 32 constitute a control unit or control means for the valve 11. As in the processing arrangement of FIG. 2, the control unit 19, 32 functions to open the valve 11 when the heating element 18 is switched off.

The processing arrangement of FIG. 3 operates as follows:

Initially, the entire quantity of processing fluid is at a temperature below the processing temperature. The valve 23 is open so that the fluid has drained from the container 20 to the level of the overflow pipe 22, namely, the level L1. The volume of the fluid which remains in the container 20 approximates that required for the processing chamber 1. The bulk of the fluid, that is, all of the fluid excluding that required for the processing chamber 1 and to maintain circulation from the processing chamber 1 through the container 20 and the conduit 16 back to the processing chamber 1, is accommodated by the container 21 where the fluid level is indicated by L2.

To place the processing arrangement in condition for processing, the pump 15 and the heating element 18 are switched on. When the pump 15 is started, the control mechanism 35 causes the valve 23 to close. Accordingly, fluid flow from the container 20 to the container 21 can no longer occur.

Since the portion of the fluid which is not accommodated by the container 21 is relatively small, such portion is rapidly heated to the processing temperature. Once this portion of the fluid has reached the processing temperature, processing of the article 2 can begin. Furthermore, the thermostat 19 shuts off the heating element 18 when the processing temperature has been reached. Simultaneously, the thermostat 19 causes the valve 11 to open. As a result, cool fluid from the container 21 mixes with the hot fluid leaving the container 20. Due to the presence of the flow restricting member 10*a*, the amount of fluid from the container 21 is small compared to the amount of fluid from the container 20. Accordingly, the temperature drop upon mixing of the hot fluid from the container 20 with the cool fluid from the container 21 is small. Nevertheless, his temperature drop is sufficient to cause the thermostat 19 to once again switch on the heating element 18. When this occurs, the valve 11 closes. During the period immediately following the time at which the fluid which is not accommodated by the container 21 reaches the processing temperature, the valve 11 thus remains open only for very short time intervals. The short time intervals combined with the small temperature drop during each such interval has the effect that the temperature fluctuations in the processing chamber 1 remain small.

As heating continues, more and more fluid is withdrawn from the container 21 and is introduced into the circulating flow of fluid from the processing chamber 1 through the container 20 and the conduit 16 back into the processing chamber 1. Inasmuch as the valve 23 in the overflow pipe 22 remains closed while the pump 15 is operating, the container 21 is continuously emptied while the fluid level in the container 20 rises. When the container 21 has been entirely emptied, all of the fluid is at the processing temperature and the fluid in the container 20 has risen to the level L3.

Upon completion of processing, the pump 15 and the heating element 18 are switched off. Stoppage of the pump 15 causes the valve 23 to be opened via the control mechanism 35. Fluid from the container 20 then drains into the container 21 until the fluid level in the container 20 once again reaches the level L1.

If a single film or a limited number of films is to be processed and the processing time is shorter than that required to bring the entire quantity of processing fluid to the processing temperature, the processing arrangements of FIGS. 1-3 may be deactivated subsequent to processing without the need to raise the temperature of the entire quantity of processing fluid to the processing temperature. This reduces energy consumption and oxidation of the developer. Since the time required to place a processing arrangment according to the invention in condition for processing is short, the processing arrangement may be operated periodically rather than continuously with attendant reductions in energy consumption and oxidation of the developer.

Without further analysis, the foregoing will so fully reveal the gist of the present invention that others can, by applying current knowledge, readily adapt it for various applications without omitting features that, from the standpoint of prior art, fairly consitute essential characteristics of the generic and specific aspects of my contribution to the art and, therefore, such adaptations should and are intended to be comprehended within the meaning and range of equivalence of the appended claims.

I claim:

1. An arrangement for processing photosensitive articles, particularly for developing film and the like, comprising:

(a) processing means having inlet and outlet means for a processing fluid;

(b) container means for the processing fluid arranged to receive fluid discharged from said outlet means, said container means including first and second containers which respectively accommodate part of the fluid, and said first and second containers respectively having first and second outlets;

(c) conduit means connecting said first and second outlets with said inlet means;

(d) pump means for circulating the fluid;

(e) heating means for heating the fluid;

(f) flow regulating means for regulating the flow of fluid from said first container to said heating means, said regulating means having a first position in which said first outlet is closed to prevent fluid flow from said first container to said heating means, and said regulating means having a second position in which said first outlet is open to permit fluid flow from said first container to said heating means; and (g) automatic control means for said regulating means operative to maintain the latter in said first position until the fluid from said second container is heated to a predetermined temperature, said control means also being operative to move said regulating means to said second position when the fluid from said second container reaches the predetermined temperature.

2. An arrangement as defined in claim 1, said processing means being designed to accommodate a predetermined volume of the fluid during processing and the total volume of the fluid exceeding the predetermined volume; and wherein said containers are designed such that said second container accommodates approximtely the predetermined volume of the fluid prior to heating of the latter.

3. An arrangement as defined in claim 1, said processing means being designed to accommodate a predetermined volume of the fluid during processing; and wherein the total volume of said container means substantially exceeds the predetermined volume.

4. An arrangement as defined in claim 1, wherein said regulating means is located between said first container and said pump means.

5. An arrangement as defined in claim 1, wherein said regulating means comprises a valve.

6. An arrangement as defined in claim 1, wherein said second container is situated internally of said first container.

7. An arrangement as defined in claim 6, wherein said second container is located in the region of the upper end of said first container.

8. An arrangement as defined in claim 1, wherein said second container has an overflow opening which establishes communication between the interiors of said containers.

9. An arrangement as defined in claim 1, wherein said second container is funnel-shaped.

10. An arrangement as defined in claim 1, wherein said conduit means comprises a conduit which is common to said containers and branches to said first and second outlets, said regulating means being located in said first outlet.

11. An arrangement as defined in claim 10, wherein said pump means is arranged in said conduit and said heating means is situated at a location of said conduit upstream of said pump means.

12. An arrangement as defined in claim 10, wherein said control means is operative to move said regulating means to or maintain the same in said first position when the temperature of the fluid in said conduit is too low to permit such fluid to reach the predetermined temperature during passsage of the fluid through said heating means.

13. An arrangement as defined in claim 10, wherein said control means comprises a sensor in said conduit.

14. An arrangement as defined in claim 1, wherein said control means comprises a thermal sensor.

15. An arrangement as defined in claim 1, wherein said heating means surrounds said conduit means.

16. An arrangement as defined in claim 1, wherein said heating means is located in said second container.

17. An arrangement as defined in claim 1, wherein said control means is operative to deactivate said heating means when the fluid reaches the predetermined temperature.

18. An arrangement as defined in claim 17, wherein said control means is operative to activate said heating means and to move said regulating means to said first position when the temperature of the fluid falls below the predetermined temperature.

19. An arrangement as defined in claim 1, comprising flow restricting means arranged to substantially restrict the flow of fluid from said first container relative to the flow of fluid from said second container.

20. An arrangement as defined in claim 19, wherein said flow restricting means is designed such that the ratio of the rate of fluid flow from said first container to the rate of fluid flow from said second container is approximately 1:10.

21. An arrangement as defined in claim 1, comprising a pipe for transfering fluid from said second container to said first container, and a flow regulating element for said pipe having open and closed positions, said regulating element being movable from said closed to said open position in response to stoppage of said pump means.

22. An arrangement as defined in claim 21, wherein said regulating element is movable from said open to said closed position in response to starting of said pump means.

23. An arrangement as defined in claim 21, wherein said regulating element comprises a valve.

24. An arrangement as defined in claim 1, wherein said second container is arranged to directly receive fluid discharged from said outlet means.

* * * * *